(12) United States Patent
Jones et al.

(10) Patent No.: US 7,277,724 B2
(45) Date of Patent: Oct. 2, 2007

(54) MULTI-MODE MOBILE STATION AND METHOD

(75) Inventors: Bryce A. Jones, Overland Park, KS (US); Jason R. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1107 days.

(21) Appl. No.: 10/413,616

(22) Filed: Apr. 14, 2003

(65) Prior Publication Data

US 2004/0219948 A1 Nov. 4, 2004

(51) Int. Cl.
*H04B 1/38* (2006.01)

(52) U.S. Cl. ............... 455/553.1; 455/552.1; 455/442

(58) Field of Classification Search ........... 455/442, 455/436, 452.1, 552.1, 553.1
See application file for complete search history.

(56) References Cited

U.S. PATENT DOCUMENTS

| | | | |
|---|---|---|---|
| 5,781,612 A | 7/1998 | Choi et al. | |
| 5,918,172 A * | 6/1999 | Saunders et al. | 455/404.1 |
| 5,933,785 A | 8/1999 | Tayloe | |
| 6,223,053 B1 | 4/2001 | Friedmann et al. | |
| 6,526,034 B1 | 2/2003 | Gorsuch | |
| 6,658,264 B1* | 12/2003 | Irvin | 455/552.1 |
| 6,680,923 B1 | 1/2004 | Leon | |
| 2002/0085516 A1 | 7/2002 | Bridgelall | |
| 2002/0115471 A1 | 8/2002 | De Loye et al. | |
| 2002/0147008 A1 | 10/2002 | Kallio | |
| 2002/0173303 A1 | 11/2002 | Shibutani | |
| 2002/0176403 A1 | 11/2002 | Radian | |
| 2002/0187780 A1 | 12/2002 | Souissi | |
| 2002/0191557 A1 | 12/2002 | Chow et al. | |
| 2002/0191635 A1 | 12/2002 | Chow et al. | |
| 2002/0198020 A1 | 12/2002 | Mooney | |
| 2003/0026247 A1 | 2/2003 | Bernstein | |
| 2003/0039242 A1 | 2/2003 | Moore, Jr. | |
| 2003/0043773 A1 | 3/2003 | Chang | |
| 2003/0045294 A1 | 3/2003 | Kumar et al. | |
| 2003/0053434 A1 | 3/2003 | Chow et al. | |
| 2003/0133421 A1 | 7/2003 | Sundar et al. | |
| 2003/0134636 A1 | 7/2003 | Sundar et al. | |
| 2003/0134638 A1 | 7/2003 | Sundar et al. | |

(Continued)

FOREIGN PATENT DOCUMENTS

WO    WO 00/28752 A1    5/2000

(Continued)

OTHER PUBLICATIONS

SpectraLink, "NetLink Wireless Telephone: Frequently Asked Questions," Jan. 8, 2003.

(Continued)

*Primary Examiner*—Creighton Smith

(57) ABSTRACT

A mobile station has multiple communication modules for multiple wireless communication modes. In a first wireless communication mode, the mobile station communicates with a wireless wide area network and is identified by a first, mobile directory number. In a second wireless communication mode, the mobile station communicates with a wireless local area network and is still identified by the first, mobile directory number. In a third wireless communication mode, the mobile station communicates with the wireless local area network but is identified by a second, local directory number.

27 Claims, 3 Drawing Sheets

U.S. PATENT DOCUMENTS

| | | |
|---|---|---|
| 2003/0134650 A1 | 7/2003 | Sunder et al. |
| 2003/0235167 A1 | 12/2003 | Kuffner |
| 2004/0057408 A1 | 3/2004 | Gray |
| 2004/0087307 A1 | 5/2004 | Ibe et al. |
| 2004/0105434 A1 | 6/2004 | Baw |
| 2004/0203791 A1* | 10/2004 | Pan et al. .................. 455/442 |

FOREIGN PATENT DOCUMENTS

| | | |
|---|---|---|
| WO | WO 02/054820 A1 | 7/2002 |
| WO | WO 03/061177 A2 | 7/2003 |
| WO | WO 03/085847 A2 | 10/2003 |

OTHER PUBLICATIONS

SpectraLink, "Wi-Fi Telephony: Wireless Voice over IP Presents New Opportunities, Challenges," May 15, 2002.

SpectraLink, "NetLink Wireless Telephone: Wireless IP Telephony Solution for the Enterprise," Sep. 30, 2002.

Symbol, "Communication Subsystems for Spectrum24® Wireless Networks," http://www.symbol.com/products/whitepapers/whitepapers_subsys_spectra24.html., Mar. 11, 2003.

Cisco Systems Inc., "Cisco ATA 186 Analog Telephone Adaptor," Data Sheet, Aug. 25, 2002.

International Search Report for International Application No. PCT/US2004/020259, mailed Mar. 2, 2005.

Written Opinion for International Application No. PCT/US2004/020259, mailed Mar. 2, 2005.

International Preliminary Report on Patentability for Int'l Application No. PCT/US2004/020259, dated Aug. 10, 2006.

* cited by examiner

MULTI-MODE MOBILE STATION AND METHOD

BACKGROUND

1. Field of the Invention

The present invention relates to telecommunications and, more particularly, to a multi-mode mobile station and method of using it for wireless communication.

2. Description of Related Art

A user of telecommunication services may regularly use a number of different telephony devices, associated with different telephone numbers, to send and receive calls. For example, at home, a user may use a landline telephone associated with the user's home telephone number. At work, the user may use another landline telephone associated with the user's work telephone number. The user may also use a mobile station, which may be a wireless telephone, a wirelessly-equipped personal digital assistant (PDA), or other wireless communication device, associated with a mobile telephone number such as a mobile directory number (MDN). The mobile station is typically able to communicate with a wireless wide area network (WWAN) to send and receive calls in many different locations, e.g., any area served by the WWAN, using the mobile telephone number. Accordingly, a typical user may want to be able to use certain telephone numbers to send and receive calls while in certain locations (e.g., a home number while at home and/or a work number while at work) and to be able to use his or her mobile telephone number in as many locations as possible, including, for example, home and work locations.

However, good wireless coverage is lacking in many areas, particularly in buildings that may serve as home or work locations for certain users. Moreover, even if wireless coverage is improved in such areas, a user may still be faced with the inconvenience of managing two or more telephony devices. For example, while at work, calls to a user may come either to a landline telephone associated with the user's work number or to a mobile station associated with the user's mobile telephone number. Accordingly, there is a need to provide systems and methods that allow a user to more conveniently manage the various telephone numbers that the user may want to use to send or receive calls.

SUMMARY

In a first principal aspect, an exemplary embodiment of the present invention provides a multi-mode mobile station. The multi-mode mobile station comprises a first communication module for a first wireless communication mode in which the mobile station is identified by a first directory number, a second communication module for a second wireless communication mode in which the mobile station is also identified by the first directory number, and a third communication module for a third wireless communication mode in which the mobile station is identified by a second directory number.

In a second principal aspect, an exemplary embodiment of the present invention provides a method of communication involving a mobile station and a wireless local area network (WLAN). The mobile station is able to communicate with a wireless wide area network (WWAN) using a first directory number. The WLAN is communicatively coupled to a packet-switched network. In accordance with the method, the mobile station associates with the WLAN and transmits a first registration message. In response to the first registration message, the first directory number is registered as being accessible via the WLAN. The mobile station transmits a second registration message. In response to the second registration message, the mobile station is associated with a second directory number accessible via the WLAN.

DETAILED DESCRIPTION OF EXEMPLARY EMBODIMENTS

Figure 1:
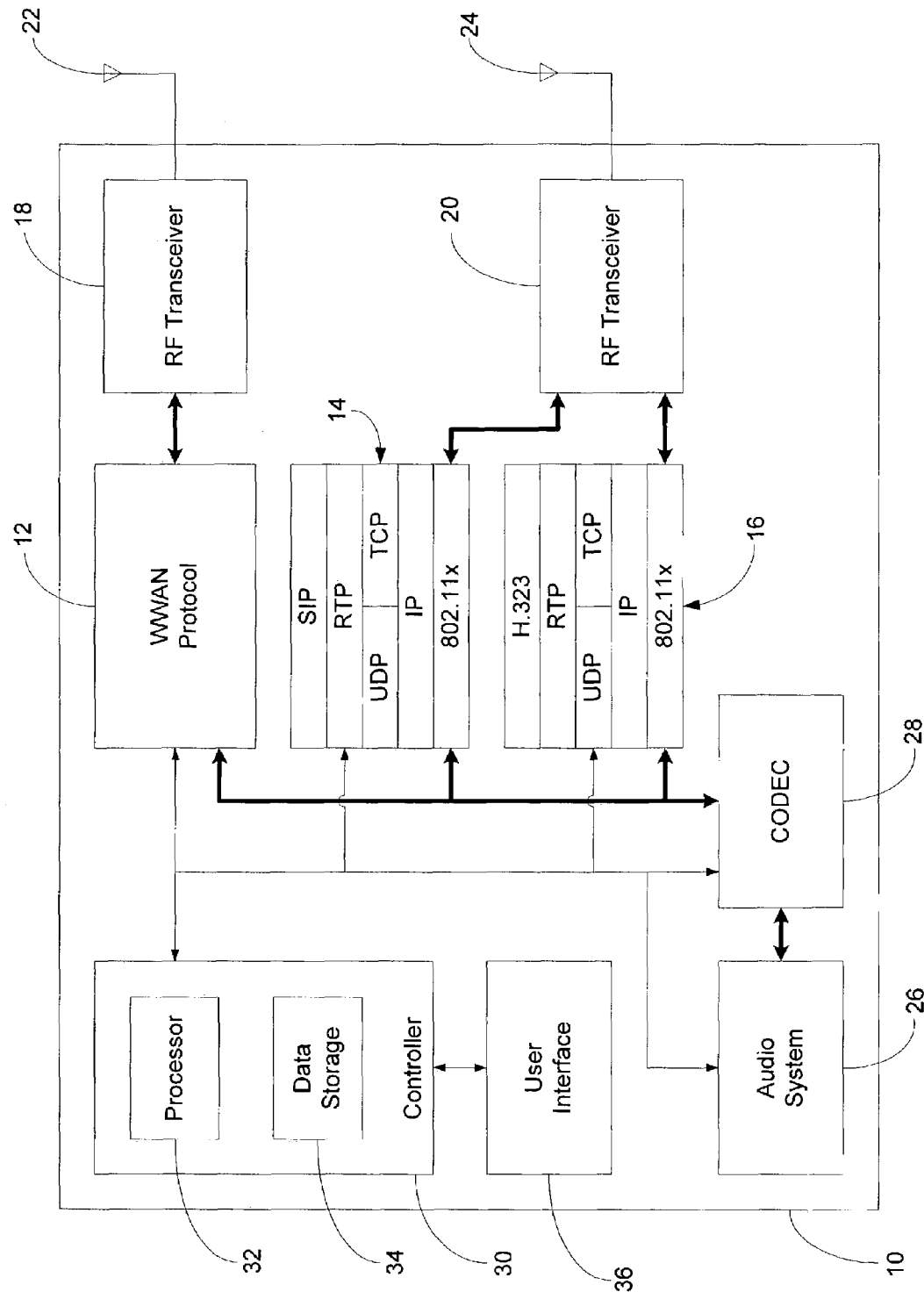
FIG. 1 is a simplified block diagram of a multi-mode mobile station, in accordance with an exemplary embodiment of the present invention.

The present invention, in exemplary embodiments, provides a multi-mode mobile station that is able to communicate in a plurality of wireless communication modes and that can be identified by different telephone numbers in different wireless communication modes. The different wireless communication modes may involve the use of different frequency bands, modulation types, and/or communication protocols. The multi-mode mobile station may use its wireless communication modes to send and receive voice, data, graphics, video, and/or other media. In some cases, the multi-mode mobile station may be able to communicate in more than one wireless communication mode at a time.

The multi-mode mobile station may use different wireless communication modes to communicate with different wireless communication systems. Such wireless communication systems may include a wireless wide area network (WWAN). A WWAN typically provides wireless coverage in a relatively large geographic area, such as an entire city, often by using a plurality of contiguous wireless coverage areas, such as cells or sectors. In addition, WWANs typically use licensed frequency bands. The wireless communication in a WWAN may occur in an analog format, such as the Advanced Mobile Phone Service (AMPS), or in a digital format, such as code division multiple access (CDMA), time division multiple access (TDMA), or Global System for Mobile communication (GSM). A WWAN may include switching systems, such as mobile switching centers (MSCs), to carry traffic in a circuit-switched format, and may use signaling protocols, such as SS7 and IS-41, to route calls through the WWAN and through the public switched telephone network (PSTN). Alternatively, a WWAN may carry some or all of its traffic in a packet-switched format, such as a voice over packet (VoP) format.

The multi-mode wireless station may also be able to communicate with a wireless local area network (WLAN). A WLAN typically provides wireless coverage in a relatively limited area, such as in a building or part of a building. In addition, WLANs typically use unlicensed frequency bands. For example, a WLAN may be used in a private residence. In the residential case, a WLAN may be connected to analog telephones or other telephony devices, personal computers, and/or other devices. In some cases, devices may be connected to the WLAN via a media terminal adapter (MTA) or an integrated access device (IAD). A WLAN may also be used in an enterprise network, either for private communication or to provide wireless access to customers (such as in a café). When used in an enterprise network, a WLAN may be connected to a private branch exchange (PBX), which, in turn, may be connected to analog telephony devices, digital telephony devices, and/or other systems. A WLAN may also be used as an adjunct to a WWAN, for example, to provide "hot spot" wireless coverage in areas such as airports. The wireless communication in a WLAN may, for example, conform to or make use of IEEE 802.11x standards, Bluetooth specifications, HomeRF specifications, HiperLAN standards, or Multichannel Multipoint Distribution Service (MMDS) techniques. The WLAN may also be connected to a packet-switched network (typically, a wide area packet-switched network) and may use packet-based signaling protocols, such as SIP, to set up communication sessions through the wide area packet-switched network.

In an exemplary embodiment, a multi-mode mobile station has three wireless communication modes. In the first wireless communication mode, the mobile station communicates with a WWAN and is identified by a first directory number. In the second wireless communication mode, the mobile station communicates with a WLAN and is also identified by the first directory number. In the third wireless communication mode, the mobile station communicates with a WLAN and is identified by a second directory number. The first directory number may be mobile directory number (MDN) associated with the mobile station itself. The second directory number may be a "local" directory number (LDN) that is associated with a user agent in a particular WLAN. For example, if the WLAN is located at the user's residence, the LDN may be the user's home telephone number. Similarly, if the WLAN is located at the user's place of employment, the LDN may be the user's work telephone number. As described in more detail below, the multi-mode mobile station may become identified with the second, local directory number when it successfully registers with the user agent of the WLAN. If telephony devices, such as analog telephones, are connected to the WLAN, the multi-mode mobile station may act as an extension, sharing the LDN with those telephony devices.

In this way, when the multi-mode mobile station is in a location covered by an appropriate WLAN, such as a home or work location, the mobile station may act as an extension with a local telephone number associated with that particular location, e.g., a home or work telephone number. Thus, the user may use the multi-mode mobile station to answer calls placed to that local telephone number and to place calls so that they originate from that local telephone number. In addition, when the multi-mode mobile station is located in areas covered by an appropriate WWAN, the user may use the mobile station to answer calls placed to the mobile station's MDN and to place calls so that they originate from the mobile station's MDN.

1. Exemplary Multi-Mode Mobile Station

Referring to the drawings, FIG. 1 is a simplified block diagram of an exemplary multi-mode mobile station 10. Multi-mode mobile station 10 includes a plurality of communication modules that allow multi-mode mobile station 10 to operate in a plurality of wireless communication modes. Each communication module may include hardware, software, and/or firmware.

In the example shown in FIG. 1, multi-mode mobile station 10 includes communication modules 12, 14, and 16. Module 12 allows multi-mode mobile station 10 to operate in a first wireless communication mode in which mobile station is identified by its MDN. The first wireless communication mode may make use of a WWAN protocol for wireless communication with a WWAN. Preferably, the WWAN protocol uses a digital format, such as CDMA, TDMA, or GSM. For example, the WWAN protocol may be a CDMA protocol, e.g., conforming to IS-95 or cdma2000 specifications.

Module 14 allows multi-mode mobile station 10 to operate in a second wireless communication mode in which mobile station is also identified by its MDN. The second wireless communication mode may make use of a WLAN protocol for wireless communication with a WLAN. The WLAN protocol may, for example, conform to or make use of IEEE 802.11a, IEEE 802.11b, IEEE 802.11e, IEEE 802.11g, or IEEE 802.11h standards (referred to generally herein as "802.11x"). These 802.11x standards are incorporated herein by reference. Alternatively, the WLAN protocol could conform to or make use of Bluetooth specifications, HomeRF specifications, HiperLAN standards, MMDS techniques, or some other protocol.

More particularly, module 14 may make use of a protocol stack that includes a WLAN protocol, such as 802.11x. The WLAN protocol may comprise the lowest layers of the protocol stack of module 14. For example, the WLAN protocol may correspond to the physical and data link layers in the Open Standards Institute (OSI) model. Module 14 may also make use of higher-level protocols. For example, module 14 may use a network layer protocol, such as the Internet Protocol (IP) and a transport layer protocol, such as the User Datagram Protocol (UDP) and/or the Transmission Control Protocol (TCP). Module 14 may also include a protocol, such as the Real-Time Transport Protocol (RTP), for sending and receiving packetized media, such as VoP, in real-time media sessions. Relevant aspects of RTP are described in Schulzrinne, et al., "RTP: A Transport Protocol for Real-Time Applications," Request for Comments 1889 (January 1996), which is incorporated herein by reference. Module 14 may also include an application layer protocol, such as the Session Initiation Protocol (SIP) or H.323, for managing communication sessions. Relevant aspects of SIP are described in Rosenberg, et al., "SIP: Session Initiation Protocol," Request for Comments 3261 (June 2002), which is incorporated herein by reference. In particular, module 14 may include a user agent, such as a SIP user agent, that is able to establish communication sessions, in which mobile station 10 is identified by its MDN, and to send and receive media in such sessions. For purposes of illustration, module 14 will be described below as including a SIP protocol layer; however, other protocols could be used.

Module 16 allows multi-mode mobile station 10 to operate in a third wireless communication mode in which mobile station 10 communicates with a WLAN and is identified by a local directory number (LDN) associated with a user agent of the WLAN. Thus, the third wireless communication mode may make use of a WLAN protocol, such as 802.11x. More particularly, module 16 may make use of a protocol stack similar to that of module 14. However, the protocol stack of module 16 may include a different application layer protocol, for example, an "extension" protocol that allows mobile station 10 to operate as an extension of an LDN associated with a user agent of the WLAN. The extension protocol could be, for example, H.323, SIP, Digital European Cordless Telecommunication (DECT), Cisco's Skinny Client Control Protocol, or Nortel's Unistem protocol. For purposes of illustration, module 16 will be described below as including an H.323 layer; however, other protocols could be used. A recent version of the H.323 protocol is described in International Telecommunication Union, Recommendation H.323, "Packet-based Multimedia System" (November 2000), which is incorporated herein by reference.

Multi-mode mobile station 10 also includes one or more RF transceivers and one or more antennas for wireless communication. In the example illustrated in FIG. 1, mobile station 10 includes RF transceivers 18 and 20 with respective antennas 22 and 24. Although FIG. 1 shows two RF transceivers, mobile station 10 may, in general, include a greater or fewer number. In addition, although FIG. 1 shows each of RF transceivers 18 and 20 connected to a respective antenna, alternatively, RF transceivers 18 and 20 may share the same antenna.

RF transceiver 18 is coupled to communication module 12 for wireless communication in the first wireless communication mode. RF transceiver 20 is coupled to communication modules 14 and 16 for wireless communication in the second and third wireless communication modes. For example, RF transceiver 18 may send and receive wireless signals in one or more licensed PCS bands (e.g., frequency bands in the 1.9 GHz range) used by a WWAN, and RF transceiver 20 may send and receive wireless signals in an unlicensed 2.4 GHz frequency band used by a WLAN.

Multi-mode mobile station 10 may include an audio system 26 to convey audio, such as voice, to and from a user. Audio system 26 may include one or more microphones and speakers, which may be either internal or external. Audio system 26 may be coupled to modules 12, 14, and 16, via a codec 28. Codec 28 may convert audio signals between an analog format used by audio system 26 and one or more digital formats used by one or more of modules 12, 14, and 16. The digital formats may include Enhanced Variable Rate Vocoder (EVRC), Selectable Mode Vocoder (SMV), G.711, G.721, G.726, G.729, and/or other formats. Codec 28 may convert audio signals in different ways, e.g., using different compressed digital formats, for different ones of modules 12, 14, and 16. In this way, modules 12, 14, and 16 are able to convey speech and other audio to and from the user in the first, second, and third wireless communication modes, respectively. In some embodiments, one or more of modules 12, 14, and 16 may also be able to convey data, graphics, video, and/or other media.

Multi-mode mobile station 10 may be controlled by a controller 30. Controller 30 may, in turn, include a processor 32 and data storage 34. Data storage 34 may include volatile memory, such as RAM, and/or non-volatile memory, such as Flash ROM. Data storage 34 may store a plurality of machine language instructions that are executed by processor 32 to control many of the functions of multi-mode mobile station 10, such as, for example, the functions of modules 12, 14, and 16. In this regard, some or all of modules 12, 14, and 16 may be provided as software stored in data storage 34.

Multi-mode mobile station 10 may also include a user interface 36 coupled to controller 30. User interface 36 may include one or more input devices, such as keys, buttons, switches, touch screens, and/or other components with which a user may provide input to mobile station 10. User interface 36 may also include one or more output devices, such as lights, display screens, ringers, buzzers, vibration mechanisms, and/or other components that provide a user-discernible output. In addition, controller 30 may coordinate the operations of user interface 36 and audio system 26, for example, for multi-media applications.

2. Exemplary Architecture

Figure 2:
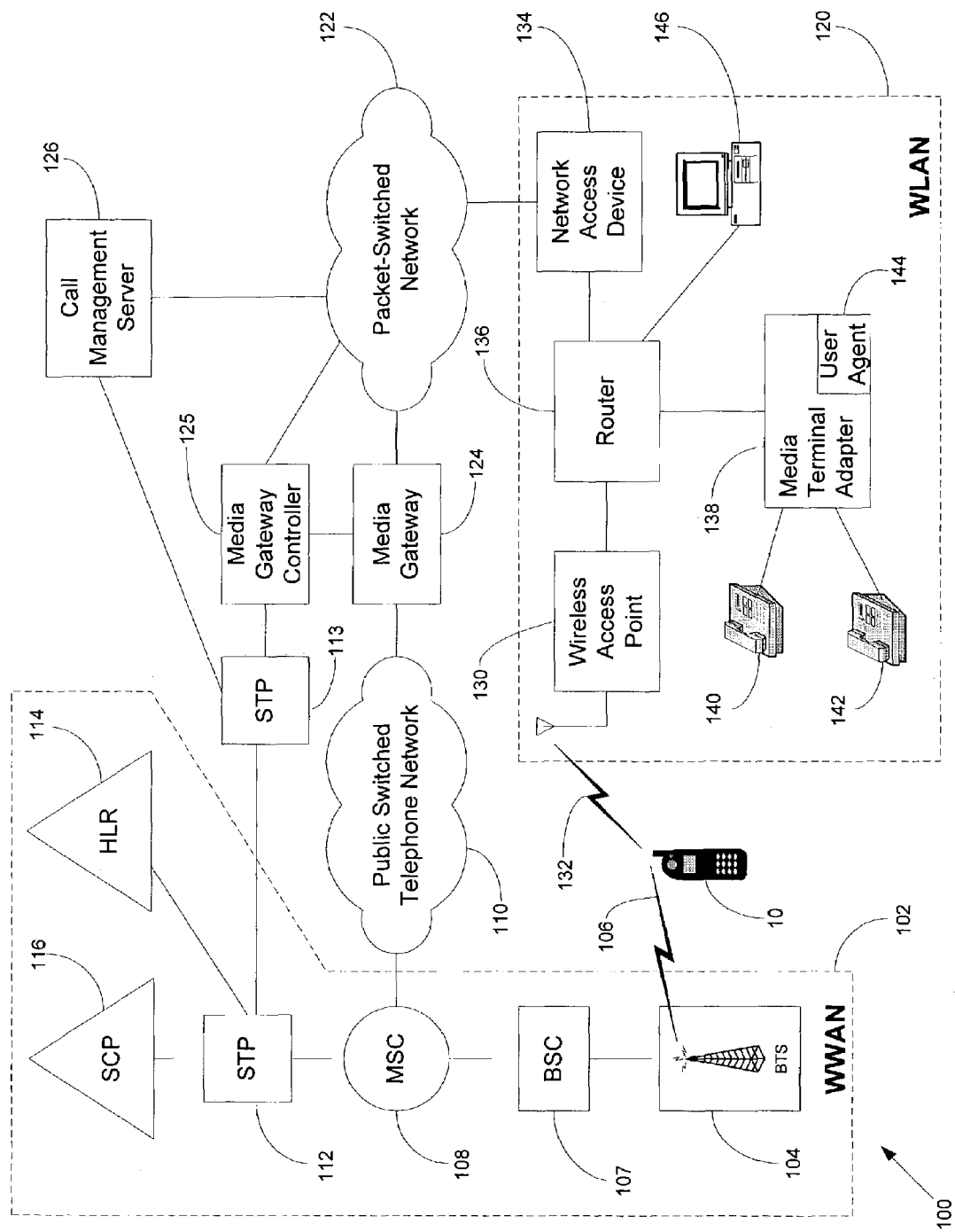
FIG. 2 is a simplified block diagram of a wireless telecommunications system that includes a wireless wide area network (WWAN) and a wireless local area network (WLAN) that are able to communicate with the multi-mode mobile station of FIG. 1, in accordance with an exemplary embodiment of the present invention.

FIG. 2 is a simplified block diagram of an exemplary wireless telecommunications system 100 that can communicate with multi-mode mobile station 10. Wireless telecommunications system 100 includes network elements that function together as a wireless wide area network (WWAN) 102. WWAN 102 may include a base transceiver station (BTS) 104 that provides a wireless coverage area within which BTS 104 may communicate with one or more mobile stations, such as multi-mode mobile station 10, over an air interface 106. Although FIG. 2 shows only BTS 104, WWAN 102 may include a plurality of BTSs that may provide a plurality of wireless coverage areas. The communications between BTS 104 and mobile station 10 may occur in a digital format, such as CDMA, TDMA, GSM, or they may occur in an analog format, such as AMPS. A preferred wireless communications format is "CDMA 2000," such as described in EIA/TIA/IS-2000 Series, Rev. A (published March 2000), which is incorporated herein by reference.

BTS 104 may be controlled by a base station controller (BSC) 107, which, in turn, may be controlled by a mobile switching center (MSC) 108. MSC 108 is connected to the public switched telephone network (PSTN) 110 and may use an out-of-band signaling system, such as Signaling System 7 (SS7) to route calls through PSTN 110. The SS7 or other signaling may be carried in a signaling network that includes a plurality of signal transfer points (STPs), such as STP 112 and STP 113. Thus, MSC 108 may be able to signal to a home location register (HLR) 114 and to a service control point (SCP) 116 via one or more STPs, such as STP 112. The signaling between MSC 108 and HLR 114 may conform to IS-41 specifications. A recent revision of the IS-41 specifications, ANSI/TIA/EIA-41-D-97, published in December 1997, is incorporated herein by reference. The signaling between MSC 108 and SCP 116 may conform to the specification "Wireless Intelligent Network," TIA/EIA/IS-771, published in July 1999, which is incorporated herein by reference. Other signaling protocols could be used, however.

In this way, WWAN 102 may connect incoming calls from PSTN 110, which calls may originate from calling parties using landline telephones, mobile stations, or other communication devices, to mobile station 10. Similarly, WWAN 102 may connect calls originating from mobile station 10 to their destinations, via PSTN 110. In such calls, multi-mode mobile station 10 is identified by its mobile directory number (MDN), and module 12 is used for wireless communication. Thus, calls placed to this MDN are routed to mobile station 10, and calls placed by mobile station 10 are identified as originating from this MDN.

Wireless telecommunication system 100 also includes a wireless local area network (WLAN) 120. WLAN 120 is communicatively coupled to a packet-switched network 122, which may include one or more local area networks (LANs) and/or one or more wide area network (WANs), such as the Internet. Packet-switched network 122 may route packets using a network protocol, such as the Internet Protocol (IP) in combination with the User Datagram Protocol (UDP) or Transmission Control Protocol (TCP). The IP packets may be carried over lower level protocols, such as asynchronous transfer mode (ATM) protocols. Protocols, such as RTP, may be used to carry voice or other media through packet-switched network 122 in a real-time format.

Packet-switched network 122 may be communicatively coupled to PSTN 110 via a media gateway 124. Media gateway 124 may convert between media formats used in PSTN 110 and packet-switched network 122. For example, PSTN 110 may carry media in a pulse code modulated (PCM) format, whereas packet-switched network 122 may carry media in an RTP format. Media gateway 124 may be controlled by a media gateway controller 125, which, in turn, may be connected to an STP, such as STP 113, and to packet-switched network 122. Media gateway controller 125 may convert between the signaling used to route calls in PSTN 110, e.g., SS7 signaling carried by STPs, and the signaling used in packet-switched network 122.

WWAN 102 may also be connected to packet-switched network 122. For example, WWAN 102 may include an interworking function (IWF) connected between MSC 108 and packet-switched network 122 for "2G" capability. Alternatively or additionally, WWAN 102 may include a packet data serving node (PDSN) connected between BSC 107 and packet-switched network 122 for "3G" capability.

Communication sessions through packet-switched network 122 may be controlled by a call management server 126. Call management server 126 may use SIP and/or other protocols to control such communication sessions. For example, in the case that SIP is used, call management server 126 may include a SIP registrar and may be accessible via one or more SIP proxy servers. Call management server 126 may also be able to communicate with HLR 114, for example, via STPs 112 and 113. Such communication may occur, for example, to manage the mobility of mobile stations, such as multi-mode mobile station 10. Examples of such communication are described in U.S. patent application Ser. No. 10/115,341, filed on Apr. 3, 2002, which is incorporated herein by reference.

WLAN 120 includes a wireless access point 130 that provides a wireless coverage area within which wireless access point 130 is able to communicate with multi-mode mobile station 10 over an air interface 132. Multi-mode mobile station 10 may use modules 14 and/or 16 for wireless communication with WLAN 120. The wireless communication between wireless access point 130 may conform to 802.11x or to some other protocol.

In some cases, the wireless coverage areas provided by BTS 102 and wireless access point 130 may be overlapping, so that multi-mode mobile station 10 may be able to communicate over both air interfaces 106 and 132. In addition, although FIG. 2 shows WLAN 120 with just one wireless access point 130, WLAN 120 may include a plurality of wireless access points that provide a plurality of wireless coverage areas.

WLAN 120 may include a network access device 134 for connection to packet-switched network 122. Network access device 134 is preferably a broadband device, such as a cable modem or DSL modem. A router 136 may interconnect wireless access point 130, network access device 134, and other components in WLAN 120.

WLAN 120 may include a media terminal adapter 138 connected to router 136. Media terminal adapter 138 may, in turn, be connected to one or more media terminals, such as telephony devices, that use WLAN 120 to send and receive voice and/or other media. For example, media terminal adapter 138 may be connected to analog telephones 140 and 142, as shown in FIG. 2. Thus, media terminal adapter 138 may include RJ-11 ports for connecting analog telephones 140 and 142 and may include an RJ-45 port for connecting to router 136, for example, via a $10/100$Base-T cable. Media terminal adapter 138 converts media, such as voice, between the analog format used by analog telephones 140 and 142 and the packet format used by router 136 and other components in WLAN 120. An example of a commercially available device that could be used as media terminal adapter 138 is the Cisco ATA-186 Analog Telephone Adapter, available from Cisco Systems, Inc.

Media terminal adapter 138 may also include a user agent 144 that can use protocols such as SIP and/or H.323 for establishing communication sessions through packet-switched network 122. More particularly, user agent 144 may have access to one or more local directory numbers (LDNs), which in turn, user agent 144 may associate with one or more of analog telephones 140 and 142. As a result of this association, user agent 144 may send and receive calls under the LDNs on behalf of analog telephones 140 and/or 142.

The LDNs available to user agent 144 may be directory numbers associated with media gateway 124, i.e., PSTN 110 may route calls placed to such directory numbers to media gateway 124. User agent 144 may obtain its one or more LDNs as a result of signaling with other network elements, such as media gateway 124 and/or call management server 126. Alternatively, user agent 144 may be configured to use one or more LDNs.

User agent 144 may associate telephones 140 and 142 with either the same LDN or with different LDNs. If telephones 140 and 142 are associated with the same LDN, they may act like landline extensions connected to the same telephone line. In that case, a call to the LDN will ring both of telephones 140 and telephone 142, either of telephones 140 and 142 may be used to place calls under that LDN, and both of telephones 140 and 142 may participate in calls involving that LDN.

The LDNs may be routable through packet-switched network 122 (as controlled by call management server 126) and through PSTN 110, via media gateway 124. Thus, when a telephony device connected to PSTN 110 places a call to an LDN that user agent 144 has associated with telephone 140, PSTN 110 routes the call to media gateway 124, media gateway 124 routes the call through packet-switched network 122 to user agent 144 (e.g., using SIP signaling with call management server 126), and then user agent 144 causes media terminal adapter 138 to ring telephone 140. If telephones 140 and 142 are associated with the same LDN, then both may ring. Similarly, when telephone 140 is used to dial digits to place a call, user agent 144 responsively routes the call through packet-switched network 122 to media gateway 124, and media gateway 124 routes the call to its destination through PSTN 110. In the signaling associated with the call, the originator of the call may be identified by the LDN associated with telephone 140.

As described in more detail below, multi-mode mobile station 10 may use modules 14 and 16 to communicate with WLAN 120 in different ways. For example, in the wireless communication mode provided by module 14, mobile station 10 may use WLAN 120 primarily for wireless access to packet-switched network 122. In particular, module 14 may include a SIP user agent that allows mobile station 10 to establish communication sessions through packet-switched network 122 without assistance from user agent 144.

In contrast, module 16 may communicate with user agent 144, using a protocol such as H.323, to become associated with an LDN. For example, user agent 144 may associate mobile station 10 with an LDN in response to mobile station 10 successfully registering with user agent 144, e.g., using H.323. The LDN that user agent 144 associates with mobile station 10 may be one that has already been associated with telephone 140 and/or telephone 142, or it may be one that has not been associated with any telephony device connected to WLAN 120.

Once mobile station 10 is associated with an LDN in this way, user agent 144 may send and receive calls under that LDN on behalf of mobile station 10. Thus, a user of mobile station 10 may dial digits (e.g., through user interface 36) to originate a call to a directory number corresponding to the dialed digits. In response, mobile station 10 may use module 16 to transmit a request (e.g., using the H.323 protocol) to user agent 144 to originate a call to the dialed directory number. In response, user agent 144 may engage in signaling (e.g., SIP signaling with media gateway controller 125 and/or call management server 126) to establish a communication session with media gateway 124 via packet-switched network 122. PSTN 110 may, in turn, route the call from media gateway 124 to the dialed directory number. The signaling in packet-switched network 122 and in PSTN 110 may use the LDN that user agent 144 associated with mobile station 10 to identify the originator of the call. Similarly, when user agent 144 receives a request, e.g., a SIP INVITE message, to establish a communication session with the LDN associated with mobile station 10, user agent 144 may responsively alert mobile station 10 (e.g., using the H.323 protocol) of the incoming call. In addition, if in these examples mobile station 10, telephone 140, and telephone 142 are all associated with the same LDN, then calls placed to that LDN may ring all three devices, any of the three devices may be used to place calls under that LDN, and all three devices may participate in calls involving that LDN.

WLAN 120 may include other components, such as one or more computers 146 connected to router 136. In addition, some or all of the components of WLAN 120 may be integrated together (e.g., wireless access point 130 and router 136 may be part of the same device) and/or arranged in different ways (e.g., user agent 144 may be located in router 136 or computer 146). In addition, in an exemplary embodiment, some or all of the components of WLAN 120 are located on a customer's premises, such as a residential or business location.

3. Exemplary Operation

Figure 3:
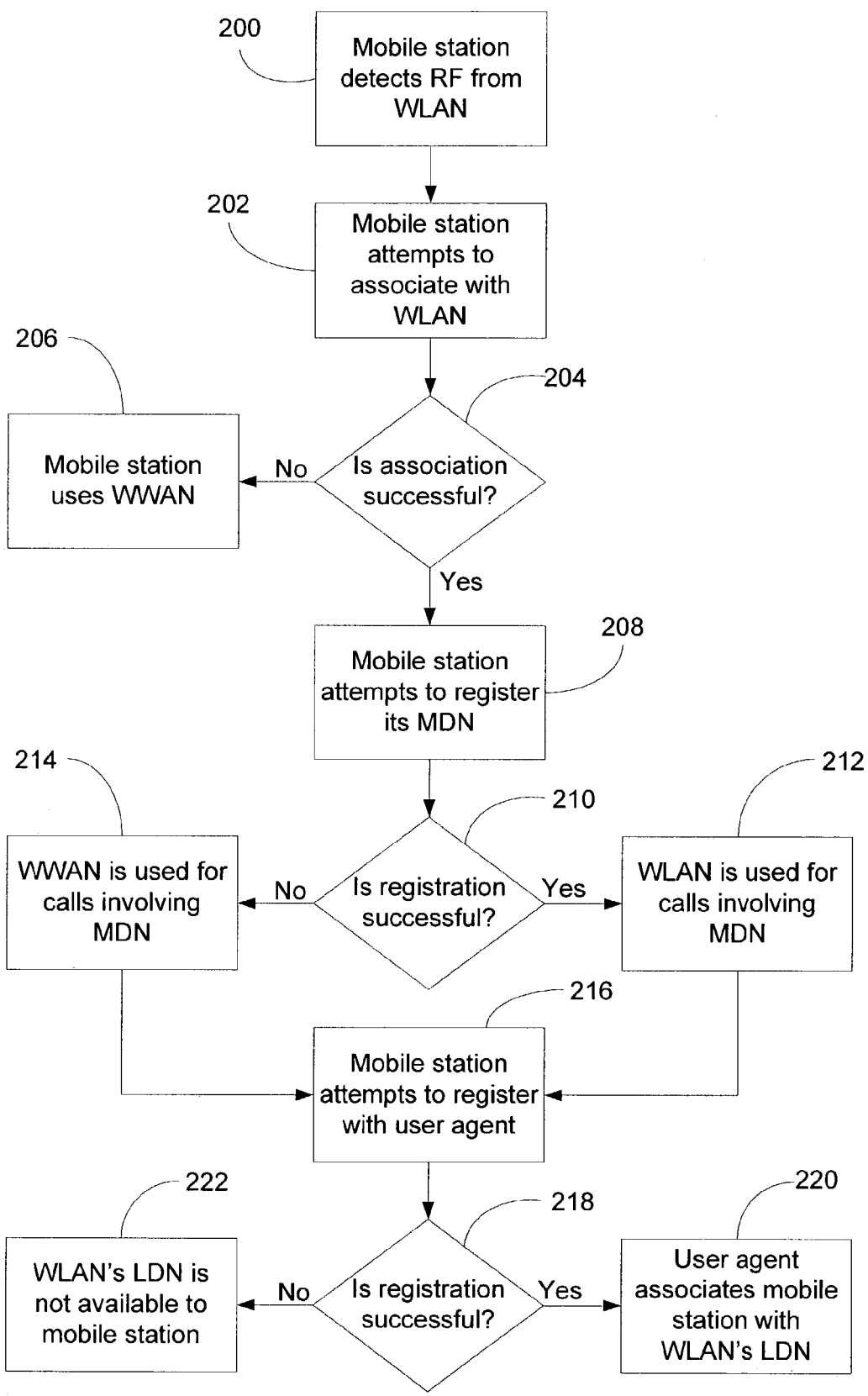
FIG. 3 is a flow chart illustrating an exemplary method of communication between the multi-mode mobile station of FIG. 1 and the WLAN of FIG. 2, in accordance with an exemplary embodiment of the present invention.

The flow chart of FIG. 3 illustrates an exemplary method of using multi-mode mobile station 10 with WLAN 120. The process may begin when mobile station 10 detects radio frequency (RF) emissions from WLAN 120, as indicated in block 200. At this point, mobile station 10 may be, but need not be, in an area served by WWAN 102, such as the wireless coverage area of BTS 104. Mobile station 10 may use a number of different methods to determine when to try to detect RF that may emanate from a WLAN. For example, mobile station 10 may periodically check for RF emissions in frequency bands that may be used by WLANs, e.g., frequency bands in the 2.4 GHz range. Alternatively, mobile station 10 may use information about its current location to determine when to check for RF from WLANs. Examples of such approaches are described in a U.S. patent application titled "Method for Determining Availability of a Radio Network," Attorney Docket No. 2126, filed on Mar. 18, 2003, which is incorporated herein by reference.

Once mobile station 10 detects RF from WLAN 120, mobile station 10 may attempt to associate with WLAN 120, as indicated in block 202. In general, the signaling involved in attempting to associate with WLAN 120 may depend on the particular WLAN protocol that is used. However, the signaling may involve procedures to authenticate mobile station 10 for access to WLAN 120. For example, WLAN 120 may require mobile station 10 to transmit a valid username, password, PIN number, digital certificate, MAC address, or other code or identifier before granting access.

How the exemplary method proceeds may depend on whether the attempt by mobile station 10 to associate with WLAN 120 was successful, as indicated by block 204. If the association attempt was not successful, then mobile station 10 may use WWAN 102 for communication, if available, as indicated by block 206. However, mobile station 10 may again attempt to associate with WLAN 120 at a later time.

If mobile station 10 has successfully associated with WLAN 120, then mobile station 10 may perform various registration procedures to establish its availability to send and receive calls via WLAN 120. For example, mobile station 10 may attempt to register its MDN as being accessible via WLAN 120, as indicated by block 208. This registration step may, for example, involve module 14 of mobile station 10 engaging in SIP signaling with call management server 126. As a result of this signaling, call management server 126 may store an indication that calls to the MDN should be routed to user agent 144 of WLAN 120. Call management server 126 may also signal to HLR 114 that call management server 126 knows the location of mobile station 10, i.e., the mobile station with that MDN. As a result, when HLR 114 receives a query (e.g., an IS-41 LOCREQ query) from an MSC seeking the location of mobile station 10, identified by its MDN, HLR 114 can, in turn, query call management server 126 to determine how the call should be routed in order to reach mobile station 10.

How calls involving this MDN are routed may depend on whether this registration attempt was successful, as indicated by block 210. If registration was successful, then WLAN 120 is used for calls involving this MDN, as indicated by block 212. In that case, calls originating from mobile station 10 under that MDN are carried by WLAN 120, and routed through packet-switched network 122, media gateway 124, and PSTN 110, as may be required. In addition, calls placed to that MDN could be initially routed to WWAN 102 because, for example, the MDN may be a directory number allocated to an MSC in WWAN 102. However, WWAN 102 may, e.g., based on information contained in HLR 114, then route the call to WLAN 120, via media gateway 124 and packet-switched network 122.

If, however, the registration attempt was unsuccessful, then WWAN 102 is used for calls involving that MDN, as indicated by block 214, provided that mobile station 10 is in an area served by WWAN 102. In that case, calls originating from mobile station 10 under that MDN are carried by WWAN 102 and routed through PSTN 110, as may be required. Similarly, calls placed to that MDN are routed to WWAN 102.

Whether or not the attempt by mobile station 10 to register its MDN was successful, mobile station 10 may also attempt to register with user agent 144, as indicated by step 216. In this registration process, user agent 144 may function as an H.323 gatekeeper, with module 16 of mobile station 10 attempting to register as a terminal in the zone served by user agent 144. Alternatively, DECT or other protocols could be used for this registration process.

Whether mobile station 10 becomes associated with an LDN may depend on whether the attempt to register with user agent 144 is successful, as indicated by block 218. If registration with user agent 144 was successful, then user agent 144 associates mobile station 10 with an LDN, as indicated by block 220. This LDN may be, but need not be, the same as a local directory number associated with telephone 140 and/or telephone 142. With mobile station 10 associated with this LDN, mobile station 10 can originate and receive calls under this LDN, with user agent 144 acting on behalf of mobile station 10.

In addition, with this LDN available to mobile station 10, the user of mobile station 10 may be able to indicate (e.g., through user interface 36), whether to use the MDN or the LDN when originating a given call. Similarly, when mobile station 10 receives a call, mobile station 10 may indicate to the user (e.g., via user interface 36), whether the call is to the MDN or to the LDN.

Mobile station 10 may also have calls to the MDN forwarded to the LDN. The user of mobile station 10 may request this call forwarding feature (e.g., via user interface 36), either as an option that the user selects in advance or as an option that the user selects once mobile station 10 has been associated with the LDN. Alternatively, mobile station 10 may request this call forwarding feature automatically after it becomes associated with the LDN. The requested call forwarding may be conditional (e.g., a call is forwarded to the LDN only if the call placed to the MDN encounters a busy or no-answer condition), or the requested call forwarding may be unconditional. To achieve this call forwarding, mobile station 10 may transmit a feature request to WWAN 102 requesting that calls to the MDN be forwarded to the LDN, either conditionally or unconditionally. HLR 114 may receive the call forwarding request and implement it by placing an appropriate indication in a service profile associated with the MDN. Alternatively, this call forwarding feature could be implemented in other ways.

If, however, the attempt to register with user agent 144 was unsuccessful, then the LDNs of user agent 144 in WLAN 120 may not be available to mobile station 10. Nonetheless, mobile station 10 may still be able to use WLAN 120 for calls involving its MDN, provided the registration attempt of block 208 was successful.

Although the attempt to register MDN occurs before the attempt to register with user agent 144 in the example illustrated in FIG. 3, these registration attempts may occur in a different order or may occur substantially simultaneously. Moreover, FIG. 3 is intended to illustrate only one example communications between multi-mode mobile station 10 and WLAN 120. Thus, multi-mode mobile station 10 and WLAN 120 could be used in other ways.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A multi-mode mobile station comprising:
   a first communication module for a first wireless communication mode in which said mobile station is identified by a first directory number;
   a second communication module for a second wireless communication mode in which said mobile station is identified by said first directory number; and
   a third communication module for a third wireless communication mode in which said mobile station is identified by a second directory number.

2. The multi-mode mobile station of claim 1, further comprising:
   a first transceiver for wireless communication in a first frequency band; and
   a second transceiver for wireless communication in a second frequency band.

3. The multi-mode mobile station of claim 2, wherein said first communication module uses said first transceiver for said first wireless communication mode, said second communication module uses said second transceiver for said second wireless communication mode, and said third communication module uses said second transceiver for said third wireless communication mode.

4. The multi-mode mobile station of claim 1, wherein said first communication mode uses a wide area wireless network (WWAN) communication protocol and said second and third communication modes use a local area wireless network (WLAN) communication protocol.

5. The multi-mode mobile station of claim 4, wherein said WWAN communication protocol is a code division multiple access (CDMA) protocol.

6. The multi-mode mobile station of claim 4, wherein said WWAN communication protocol is a Global System for Mobile communication (GSM) protocol.

7. The multi-mode mobile station of claim 4, wherein said WLAN communication protocol is an 802.11x protocol.

8. The multi-mode mobile station of claim 4, wherein said WLAN communication protocol is a Bluetooth protocol.

9. The multi-mode mobile station of claim 4, wherein said WLAN communication protocol is a Multichannel Multipoint Distribution Service (MMDS) protocol.

10. The multi-mode mobile station of claim 1, wherein said second communication module includes a user agent that uses an application layer protocol for establishing communication sessions through a packet-switched network.

11. The multi-mode mobile station of claim 10, wherein said application layer protocol is the Session Initiation Protocol (SIP).

12. The multi-mode mobile station of claim 10, wherein said application layer protocol is H.323.

13. The multi-mode mobile station of claim 1, wherein said third communication module uses an application layer protocol for communicating with a WLAN user agent.

14. The multi-mode mobile station of claim 13, wherein said application layer protocol is H.323.

15. The multi-mode mobile station of claim 13, wherein said application layer protocol is SIP.

16. The multi-mode mobile station of claim 13, wherein said application layer protocol is DECT.

17. A method of communication involving a mobile station and a wireless local area network (WLAN), said mobile station being able to communicate with a wireless wide area network (WWAN) using a first directory number, said WLAN being communicatively coupled to a packet-switched network, said method comprising:
   said mobile station associating with said WLAN;
   said mobile station transmitting a first registration message;
   in response to said first registration message, registering said first directory number as being accessible via said WLAN;
   said mobile station transmitting a second registration message; and
   in response to said second registration message, associating said mobile station with a second directory number accessible via said WLAN.

18. The method of claim 17, wherein said first directory number is a mobile directory number (MDN).

19. The method of claim 18, wherein said second directory number is a local directory number (LDN) associated with a user agent of said WLAN.

20. The method of claim 19, wherein associating said mobile station with a second directory number comprises:
said user agent associating said mobile station with said LDN.

21. The method of claim 20, further comprising:
said user agent associating a telephony device with said LDN, whereby said mobile station and said telephony device function as extensions on said LDN.

22. The method of claim 21, wherein said telephony device is an analog telephone connected to a media terminal adapter.

23. The method of claim 22, wherein said media terminal adapter includes said user agent.

24. The method of claim 20, further comprising:
said mobile station transmitting a request to originate a call under said LDN to a dialed directory number;
in response to said request, said user agent establishing a communication session through said packet-switched network to reach said dialed directory number.

25. The method of claim 20, further comprising:
said user agent receiving, via said packet-switched network, a request to establish a communication session with said LDN;
in response to said request, said user agent alerting said mobile station.

26. The method of claim 20, wherein said mobile station includes a mobile user agent, further comprising:
said mobile user agent receiving a request to originate a call under said MDN to a dialed directory number;
in response to said request, said mobile user agent establishing a communication session through said WLAN and said packet-switched network to reach said dialed directory number.

27. The method of claim 19, further comprising:
said mobile station transmitting a request to forward to said LDN at least certain calls placed to said MDN.

* * * * *